May 2, 1933. R. N. HOULIHAN 1,906,967

LIP STICK HOLDER

Filed July 22, 1931

Inventor
Rudolph N. Houlihan
By Wooster & Davis
Attorneys

Patented May 2, 1933

1,906,967

UNITED STATES PATENT OFFICE

RUDOLPH N. HOULIHAN, OF BRIDGEPORT, CONNECTICUT, ASSIGNOR TO THE BRIDGEPORT METAL GOODS MANUFACTURING CORPORATION, OF BRIDGEPORT, CONNECTICUT, A CORPORATION OF CONNECTICUT

LIP STICK HOLDER

Application filed July 22, 1931. Serial No. 552,398.

This invention relates to new and useful improvements in lipstick holders of the type including a receptacle and cover and a carrier in the receptacle and having a part extending through a slot in a wall of the receptacle whereby the carrier may be shifted toward the open end of the receptacle to expose the lipstick for use, and after use of the lipstick shifted to withdraw the same into the receptacle.

An object of the invention is to provide a lipstick holder of the type stated wherein the carrier is lanced in a side wall and the lanced material pressed out into spaced relation to the carrier and preferably in the form of a cross bar connected with the carrier by upper and lower strap members, the strap members operating in the slot in the wall of the receptacle or casing and the cross bar being disposed adjacent the outer surface of the slotted wall of the receptacle or casing at each side of the slot and the carrier being held against the inner surface of said wall of the receptacle by the cross bar whereby the carrier may have movement longitudinally of the receptacle but is held against movement transversely thereof and particularly tipping and binding in the casing.

Other objects and advantages will become apparent from a consideration of the following detailed description taken in connection with the accompanying drawing wherein a satisfactory embodiment of the invention is shown. However, it will be understood that the invention is not limited to the details disclosed but includes such variations and modifications as may be made within the scope of the appended claims to which claims reference is to be had for a definition of the invention.

Figure 1:
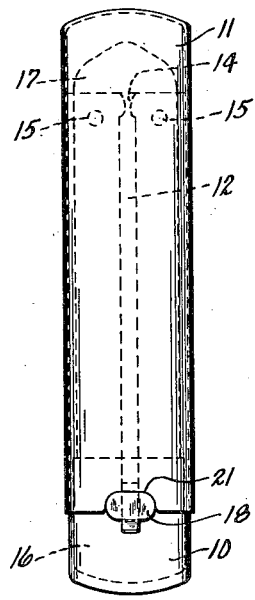
Fig. 1 is a side elevational view of a lipstick holder in accordance with the present invention, the cover for the holder being shown in place.
Figure 2:
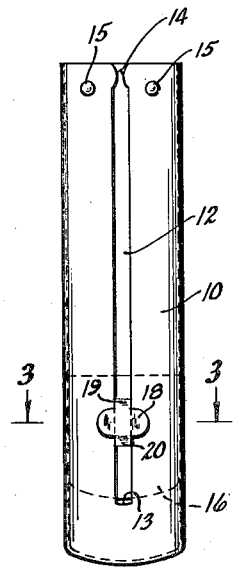
Fig. 2 is a view similar to Fig. 1, the cover being removed.
Figure 3:
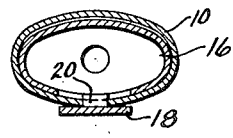
Fig. 3 is a sectional view on the line 3—3 of Fig. 2.
Figures 4, 6:
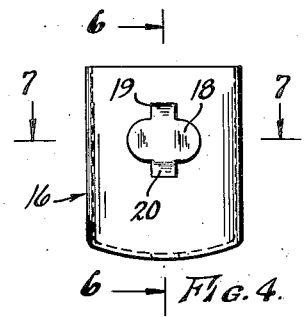
Fig. 4 is a side elevational view of the lipstick carrier removed from the receptacle or casing.
Fig. 6 is a sectional view on the line 6—6 of Fig. 4.
Figure 5:
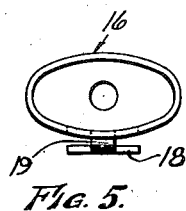
Fig. 5 is a plan view of the carrier shown in Fig. 4.
Figure 7:
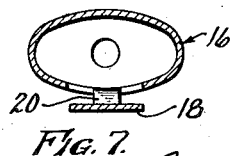
Fig. 7 is a sectional view on the line 7—7 of Fig. 4.

As shown in the drawing, the lipstick holder of the present invention includes an elongated receptacle or casing 10, which may be generally oval or other shape in cross section as shown in Fig. 3, and a cover or closure member 11 adapted to telescope over the receptacle 10 as most clearly shown in Fig. 1. The receptacle or casing 10 is in one side wall provided with a slot 12 extending longitudinally of the receptacle and stopping short of the lower end thereof as at 13 and passing through the open end of the receptacle but being restricted in width at this end as shown at 14. To each side of the slot 12 and adjacent its open end the receptacle may have lugs or projections pressed up as shown at 15 to provide frictional bearings for the cover 11 whereby to have the cover more snugly fit the receptacle as the walls on each side of the slot are resilient or have a spring action.

Within the receptacle 10 and shiftable therein in a direction longitudinally of the receptacle is a lipstick carrier 16. This carrier 16 is oval or other shape in cross section to correspond with the cross sectional configuration of the receptacle and is of such size as to be freely slidable in the receptacle. The carrier is adapted to receive a lipstick 17 as shown by the dotted lines in Fig. 1 and of course as the carrier is shifted toward the open end of the receptacle the lipstick will be projected for use and as the carrier is shifted rearwardly in the receptacle the lipstick is withdrawn into the receptacle.

An operating means is provided on the carrier whereby the same may be shifted in the receptacle. This operating means includes a cross bar or member 18 and a pair of strap members 19 and 20 extending from the cross bar intermediate the ends thereof and connecting the cross bar with the carrier. The operating means is formed by lancing the material forming one side wall of the carrier and then pressing the material laterally of the carrier whereby to dispose the bar 18 in a position in spaced relation to and parallel with the body of the carrier. The connecting strap members 19 and 20 are, of course, only lanced at their sides or edges and at their upper ends remain integral with the carrier and at their inner ends remain integral with the cross bar 18.

When the carrier is within the receptacle the strap members 19 and 20 are disposed in the slot 12 in the wall of the receptacle and are preferably of a width substantially equal to the width of the slot, and since the straps are spaced apart they will assist in preventing rocking movement of the carrier in the receptacle or movement of the carrier in a direction transversely of the receptacle. This prevents binding of the carrier and the cosmetic stick in the casing and thus gives a freer smoother movement. It also prevents or at least greatly reduces the liability of the cosmetic being scraped off by the sides of the casing or the edges of its open end to make it messy and spoil its appearance. Further, with the carrier assembled in the receptacle the cross bar 18 will be disposed against or closely adjacent the outer surface of the slotted wall of the receptacle at each side of the slot therein and the carrier itself will have its lanced wall disposed against the inner surface of the slotted wall of the receptacle. Therefore, it will be appreciated that while the straps 19 and 20 serve to assist in preventing movement of the carrier in one direction transversely of the receptacle the carrier itself and the cross member 18 assist in preventing movement of the carrier transversely of the receptacle in the opposite direction. The carrier is therefore guided by the inner and outer walls of the casing at the sides of the slot and will be held against tipping and binding.

To operate or shift the carrier in a direction to expose a lipstick for use it is first necessary to remove the cover 11 since at its lower end the cover is notched as at 21 to partially receive the plate 18 and hold the carrier in its lowermost or innermost position. When the cover is removed the cross bar or member 18 may be engaged, as by a thumb nail, and the carrier shifted toward the open end of the receptacle to project the lipstick for use. As the lipstick is being used the cross member 18 may be held to prevent movement of the carrier rearwardly in the receptacle.

It will be noted in Fig. 1 that when the cover is on the receptacle and pushed to its lowermost position the bar 18 is seated in the notch 21 and forms substantially an extension of the cover. The bar and notch 21 are of substantially the same shape in outline and can be made of a shape to conform to and blend or harmonize with the general shape or design of the container and cover. It will also be noted that the bar 18 does not project beyond the surface more than substantially the thickness of the bar, and therefore, as the parts are usually made of metal of substantially the same gauge or thickness, when the cover is in position as shown in Fig. 1 the bar does not project beyond the outer surface of the cover and will not be likely to catch on other articles when carried in a pocket book or bag and so will not be operated to inadvertently project the cosmetic stick from the holder.

Having thus set forth the nature of my invention, what I claim is:

1. In a cosmetic holder, a receptacle having an open end and a longitudinally extending slot in one wall, a cosmetic carrier within the receptacle, an operating part on the carrier and extending through the slot in the wall of the receptacle, said operating part comprising a portion lanced and pressed from a side of the carrier and including a cross bar and strap members at each side of the cross bar and intermediate the ends thereof and connecting the cross bar to the carrier but spaced from the carrier, said strap members operating in the slot in the wall of the receptacle with the cross bar extending transversely of the slot and with the wall received between the carrier and the cross bar, said cross bar including substantially flat projections slidable along the outside of the container, and said cross bar adapted to be operated to shift the carrier in the receptacle and in the direction of the slot to project the cosmetic for use and to withdraw it into the receptacle after use.

2. In a cosmetic holder, a receptacle having an open end and a longitudinally extending slot in one wall, a cosmetic carrier within the receptacle, an operating part on the carrier and extending through the slot in the wall of the receptacle, said operating part comprising a portion lanced and pressed from a side of the carrier and including a cross bar extending transversely of the slot and a strap member connecting the cross bar to but spaced from the carrier, said strap member operating in the slot in the wall of the receptacle with said wall received between the carrier and the cross bar, said strap member being of a width substantially equal to the width of the slot and presenting its edges to the edges of the slot whereby to assist in holding the carrier against movement laterally of the slot, and said cross bar including substantially flat projections slidable along the outside of the container and adapted to be operated to shift the carrier in the receptacle and in the direction of the slot to project the cosmetic for use and to withdraw it into the receptacle after use.

3. In a cosmetic holder, a receptacle having an open end and a longitudinally extending slot in one wall, a cosmetic carrier within the receptacle, an operating part on the carrier and extending through the slot in the wall of the receptacle, said operating part including a bar extending transversely of the slot and comprising substantially flat projections slidable along the outer side of the slotted wall of the receptacle whereby the slotted wall is received between the bar and the carrier and the outer wall of the receptacle acts as a guide for the bar, and said bar adapted to be operated to shift the carrier in the receptacle and in the direction of the slot to project the cosmetic for use and to withdraw the cosmetic into the receptacle after use.

4. In a cosmetic holder, a receptacle having an open end and a longitudinally extending slot in one wall, a cosmetic carrier slidable longitudinally in the receptacle, and an operating part on the side of the carrier extending through the slot and including a bar extending transversely of the slot, said bar including substantially flat projections slidable along the outer walls of the receptacle on opposite sides of the slot and cooperating with the outer wall of the receptacle to guide the carrier.

5. In a cosmetic holder, a receptacle having an open end and a longitudinally extending slot in one wall, a cosmetic carrier slidable longitudinally in the receptacle and an operating part on the carrier extending outwardly through the slot to be accessible for operation outside the receptacle, said part including a bar struck up from a wall of the carrier and extending transversely of the slot, said bar including a substantially flat projection slidable along the outer surface of the receptacle at least on one side of the slot and arranged closely adjacent to said surface so as to cooperate therewith to guide the carrier.

6. In a cosmetic holder, a receptacle having an open end and a longitudinally extending slot in one wall, a cosmetic carrier within the receptacle, an operating part on the carrier and extending through the slot in the wall of the receptacle, said operating part including a bar struck up from a wall of the carrier with a connecting portion extending through the slot so that the bar is closely adjacent the outer wall of the receptacle and extends transversely of the slot, said bar including substantially flat projections slidable along the outside of the container to form a guiding means for the carrier, said bar being adapted to be operated to shift the carrier in the receptacle, and a cover open at one end to telescope over the receptacle, said cover having a notch in the edge at its open end conforming substantially to the outline of one side of the bar so that when the receptacle is in the cover the bar is seated in said notch and forms substantially an extension of the cover.

In testimony whereof I affix my signature.

RUDOLPH N. HOULIHAN.